(12) United States Patent
Moore

(10) Patent No.: US 9,126,535 B1
(45) Date of Patent: Sep. 8, 2015

(54) FENDER STEP FOR PICK-UP TRUCKS

(71) Applicant: FORD GLOBAL TECHNOLOGIES, LLC, Dearborn, MI (US)

(72) Inventor: William K. Moore, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/568,885

(22) Filed: Dec. 12, 2014

(51) Int. Cl.
*B60R 19/22* (2006.01)
*B60R 3/00* (2006.01)
*B62D 25/18* (2006.01)

(52) U.S. Cl.
CPC .. *B60R 3/00* (2013.01); *B62D 25/18* (2013.01)

(58) Field of Classification Search
CPC ............. B60R 3/00; B60R 3/02; B60R 9/02; B60R 9/065; B60R 11/06
USPC .............. 280/164.1, 770, 848, 849, 850, 853, 280/854, 856, 160, 163, 164.2
See application file for complete search history.

(56) References Cited

U.S. PATENT DOCUMENTS

| | | | | |
|---|---|---|---|---|
| 1,415,699 A * | 5/1922 | Porter | | 182/90 |
| 2,525,595 A | 10/1950 | Fergueson | | |
| 2,649,308 A * | 8/1953 | Bice, Jr. | | 280/500 |
| 3,171,671 A * | 3/1965 | Cornett | | 280/163 |
| 3,224,525 A * | 12/1965 | Letzel et al. | | 180/89.19 |
| 3,326,595 A * | 6/1967 | Ogilvie | | 296/37.6 |
| 3,378,278 A * | 4/1968 | Letzel et al. | | 280/163 |
| 4,017,093 A * | 4/1977 | Stecker, Sr. | | 280/163 |
| 4,164,358 A * | 8/1979 | Entrup | | 301/36.1 |
| 4,564,205 A * | 1/1986 | Shookman et al. | | 280/166 |
| 4,569,533 A * | 2/1986 | Gronert et al. | | 280/163 |
| 4,836,568 A * | 6/1989 | Preslik et al. | | 280/164.1 |
| 4,925,235 A * | 5/1990 | Fingerle | | 296/180.2 |
| 4,935,638 A * | 6/1990 | Straka | | 280/164.1 |
| 4,947,961 A | 8/1990 | Dudley | | |
| 4,991,906 A * | 2/1991 | Fingerle | | 296/180.2 |
| 5,265,896 A * | 11/1993 | Kravitz | | 280/163 |
| 5,538,265 A * | 7/1996 | Chen et al. | | 280/163 |
| 5,615,922 A * | 4/1997 | Blanchard | | 296/37.6 |
| 5,788,321 A * | 8/1998 | McHorse et al. | | 296/180.1 |
| 5,806,869 A * | 9/1998 | Richards | | 280/163 |
| 5,816,616 A | 10/1998 | Boyd | | |
| 6,030,018 A * | 2/2000 | Clare et al. | | 296/37.6 |
| 6,033,002 A * | 3/2000 | Clare et al. | | 296/3 |
| 6,059,341 A * | 5/2000 | Jensen et al. | | 296/37.6 |
| 6,105,231 A * | 8/2000 | Clare et al. | | 29/434 |
| 6,178,364 B1 * | 1/2001 | Delurey et al. | | 701/36 |
| 6,237,211 B1 * | 5/2001 | Clare et al. | | 29/434 |
| 6,264,222 B1 * | 7/2001 | Johnston et al. | | 280/166 |
| 6,439,634 B1 * | 8/2002 | Jensen et al. | | 296/37.6 |
| 6,533,303 B1 | 3/2003 | Watson | | |
| 6,702,329 B1 * | 3/2004 | Nishio | | 280/849 |
| 6,966,593 B2 * | 11/2005 | Plentis et al. | | 296/37.6 |
| 7,086,689 B2 * | 8/2006 | Dean | | 296/182.1 |
| 7,118,150 B2 * | 10/2006 | Bruford et al. | | 296/37.1 |
| 7,416,232 B2 * | 8/2008 | Tier et al. | | 293/117 |
| 7,686,365 B2 * | 3/2010 | Thelen et al. | | 296/37.6 |
| 7,703,784 B2 * | 4/2010 | Plavetich | | 280/164.1 |

(Continued)

*Primary Examiner* — Brodie Follman
(74) *Attorney, Agent, or Firm* — Raymond L. Coppiellie; Brooks Kushman P.C.

(57) ABSTRACT

A dually pickup truck includes a rear axle having a dual-wheel assembly on an end of the axle and a fender positioned over a portion the dual-wheel assembly. A foot-step is in cooperation with the fender providing a user easier access to a cargo bed of the truck.

20 Claims, 2 Drawing Sheets

(56) References Cited

U.S. PATENT DOCUMENTS

| | | |
|---|---|---|
| 7,819,412 B2 | 10/2010 | McPherson |
| 8,011,681 B2 * | 9/2011 | Plavetich .................. 280/164.1 |
| 8,038,164 B2 | 10/2011 | Stahl et al. |
| 8,056,913 B2 | 11/2011 | Kuntze et al. |
| 8,573,671 B2 * | 11/2013 | Watkins ....................... 296/37.8 |
| 8,770,655 B1 * | 7/2014 | Godby .......................... 296/198 |
| 2001/0038230 A1 * | 11/2001 | Clare et al. .................... 296/189 |
| 2005/0134070 A1 * | 6/2005 | Plentis et al. ................ 296/37.1 |
| 2006/0087141 A1 * | 4/2006 | Bruford et al. ............... 296/37.1 |
| 2006/0119134 A1 * | 6/2006 | Dean .......................... 296/182.1 |
| 2007/0145754 A1 * | 6/2007 | Tier et al. ...................... 293/109 |
| 2008/0231066 A1 * | 9/2008 | Harrell ......................... 296/37.6 |
| 2008/0231076 A1 * | 9/2008 | Plavetich .................. 296/183.1 |
| 2009/0033058 A1 * | 2/2009 | VanderGriend et al. ... 280/164.1 |
| 2009/0058121 A1 * | 3/2009 | Frankham .................... 296/37.6 |
| 2009/0072564 A1 * | 3/2009 | Teeple ........................... 296/10 |
| 2009/0243274 A1 * | 10/2009 | Logan .......................... 280/850 |
| 2012/0256438 A1 * | 10/2012 | Watkins ...................... 296/37.6 |
| 2014/0252798 A1 * | 9/2014 | Angelo ...................... 296/180.2 |

* cited by examiner

FENDER STEP FOR PICK-UP TRUCKS

TECHNICAL FIELD

The present disclosure relates to foot-steps for accessing cargo within a pickup truck cargo box.

BACKGROUND

Pickup trucks are motor vehicles with a front passenger area, often referred to as a cab, and an open top rear cargo area, often referred to as a box. The box usually has a substantially flat bed from which two sidewalls and a forward interconnecting headboard extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in so many different ways, including carrying a variety of types of cargo and towing various types of trailers.

Some pickup trucks include a rear axle having dual-wheels on each side of the axle. This type of truck is commonly referred to as a dually or dual-wheeled pickup truck. Dually pickup trucks are typically heavy duty pickup trucks that utilize the dual-wheels to increase payload and towing capacity. Dually pickup trucks have more robust suspension components and a taller ride height than typical pickup trucks. The increased ride height makes it difficult for a person to reach over a sidewall of the cargo box to access the cargo area. Owners of dually pickup trucks typically use the truck as a work truck and need easy access to the contents of the cargo area. Steps have been added on the rear of the vehicle to aid in climbing onto the tailgate but do not aid in side access of the box.

SUMMARY

In one embodiment, a dually pickup truck includes a rear axle having a dual-wheel assembly on an end of the axle and a fender positioned over a portion the dual-wheel assembly. A foot-step is in cooperation with the fender providing a user easier access to a cargo bed of the truck.

In another embodiment, a fender assembly for a pickup truck box includes a fender attachable to the box. The fender extends outwardly from the box to define, in combination with the box, a wheel well sized to receive a dual-wheel assembly therein. A foot-step cooperating with the fender is attachable to the box.

In another embodiment, a vehicle includes a frame supporting a cargo box having a sidewall partially defining a wheel well. A wheel assembly is at least partially disposed in the wheel well and extends transversely outward past an exterior panel of the sidewall. A fender is attached to the exterior panel and at least partially covers a portion of the wheel assembly that extends past the exterior panel. A foot-step for accessing the cargo box is disposed within the fender.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
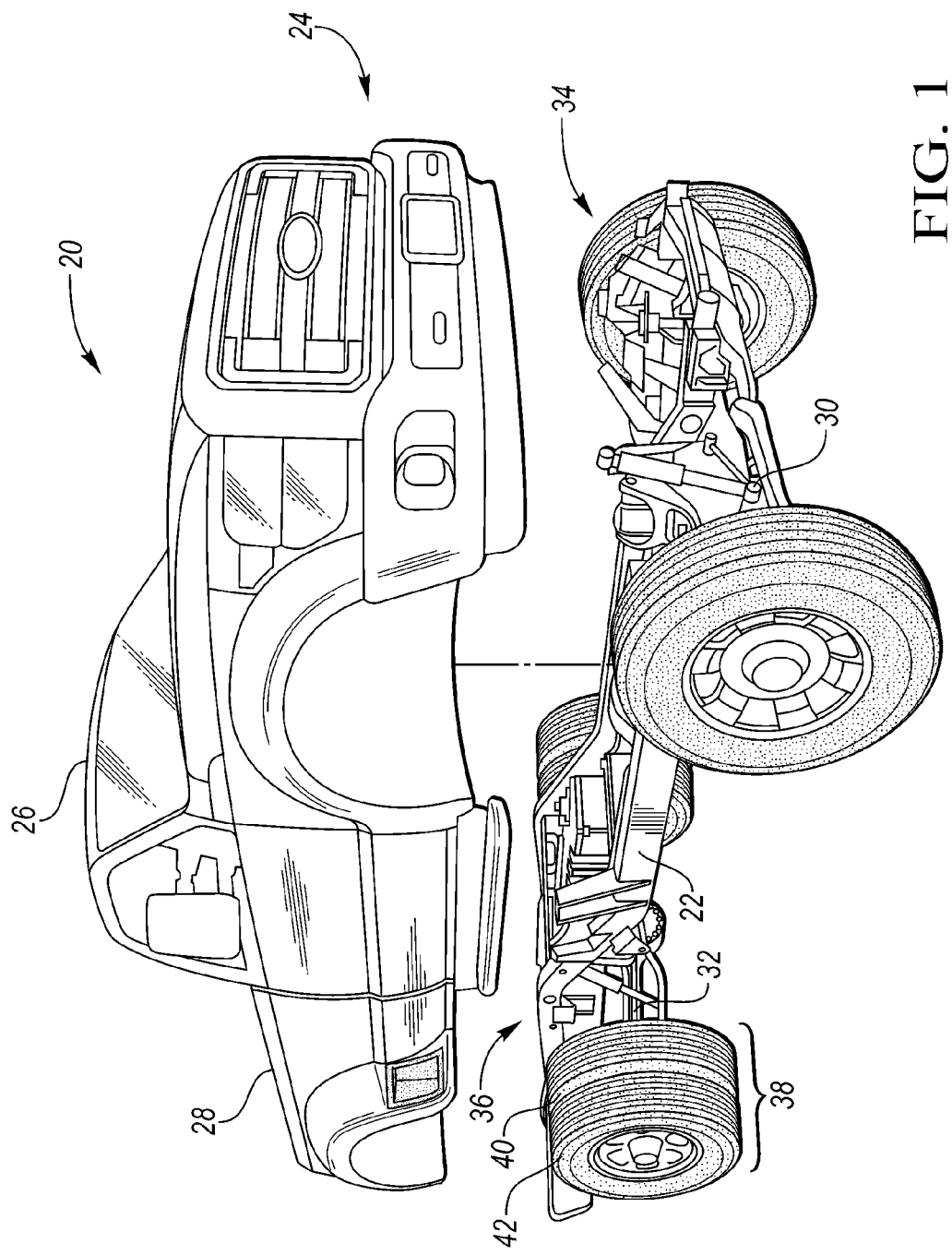
FIG. 1 is an exploded perspective view of a dually pickup truck.

Referring to FIG. 1, a vehicle 20, such as a dual-wheeled pickup truck or dually pickup truck, includes a frame 22 for supporting a body 24. The body includes a cab 26 and a cargo box 28. A front axle 30 is attached to the frame 22 near a front portion 34 of the vehicle 20 and a rear axle 32 is attached to the frame near a rear portion 36 of the vehicle 20. The rear axle 32 includes a pair of dual-wheel assemblies 38 attached on opposing ends of the axle 32. Each dual-wheel assembly 38 includes a first wheel 40 and a second wheel 42.

Figure 3:
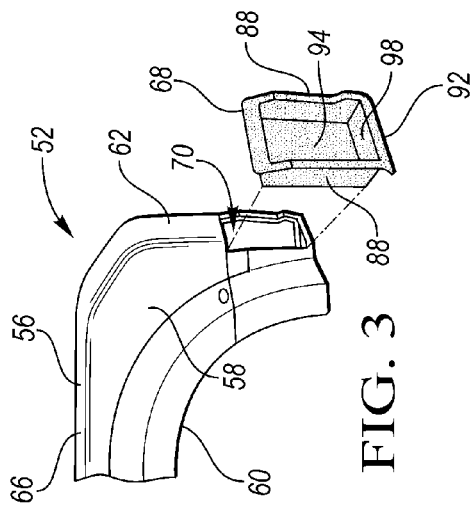
FIG. 3 is an exploded perspective view of a fender and foot-step according to one embodiment of this disclosure.
Figure 2:
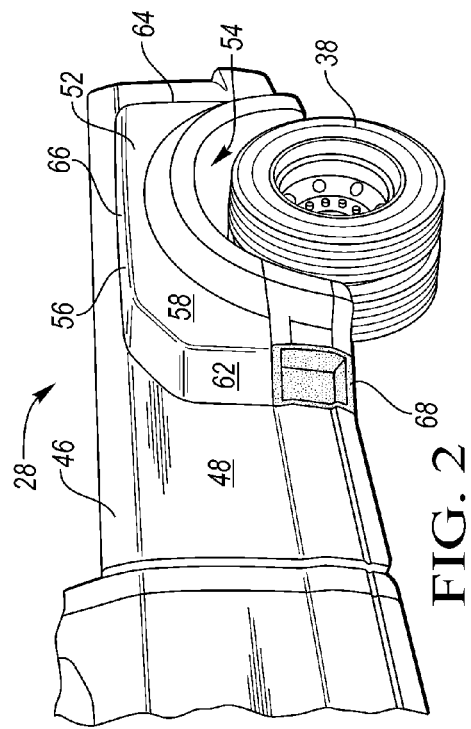
FIG. 2 is a perspective view of a rear portion of the dually pickup truck shown in FIG. 1.
Figure 4:
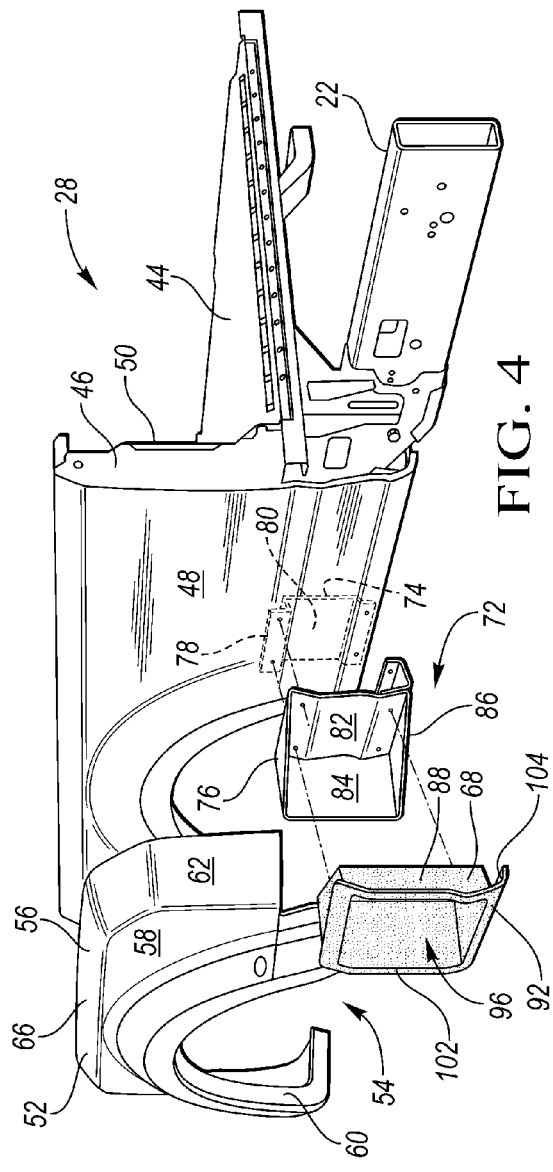
FIG. 4 is an exploded perspective view of a portion of the dually pickup truck shown in FIG. 1 with various components removed for clarity.

Referring to FIGS. 2 to 4, the cargo box 28 includes a bed 44 spanning between a pair of opposing longitudinal sides 46. Each of the sides 46 includes an exterior surface 48 and an interior surface 50. A pair of fenders 52 are attached on opposite sides of the box 28. Each fender 52 is attached to the exterior surface 48 and projects outwardly therefrom. Each fender 52 is positioned over a portion of the dual-wheel assembly 38, and defines a wheel well 54 that at least partially covers a portion of the wheel assembly 38 that extends past the exterior surface 48. Each fender 52 includes a laterally extending portion 56 that extends transversely outward from the exterior surface 48. Each fender 52 also includes a substantially vertical outer portion 58 cooperating with the laterally extending portion 56 to define at least a portion of the wheel well 54. The outer portion 58 defines a wheel opening 60 that may include a decorative flaring around a periphery of the opening 60. The laterally extending portion 56 may include a leading surface or front panel 62, a trailing surface or rear panel 64, and a top 66 that all cooperate to form a continuous surface.

Dually pickup trucks are typically heavier duty and have tall ride heights which make it difficult for a person of average height to access contents within the cargo box 28. The vehicle 20 includes a foot-step 68 disposed within the fender 52 providing a person easier access to the cargo box. The foot-step 68 may be disposed in the laterally extending portion 56 of the fender 52. The fender 52 may include an opening 70 for receiving the step 68 therein. In some embodiments, the foot-step 68 is received in an opening 70 defined in the front panel 62. In other embodiments, the foot-step 68 is received in an opening 70 defined in the rear panel 64.

Each foot-step 68 may be attached directly to one of the fenders 52 and supported by the fenders. The fenders may be reinforced to support the load applied to the step 68. Alternatively, each foot-step 68 may be attached to the vehicle 20 by a foot-step assembly 72. Typically fenders are made of thin sheet metal or plastic and are not strong enough to support a person standing on the step 68. To prevent damage to the fenders 52 and vehicle 20, the assembly 72 transfers loads from the step 68 to the longitudinal sidewall 46 or other structural member. The assembly 72 may be designed to support a 300 pound static vertical load applied to the step 68.

The step assembly 72 includes brackets for connecting the step 68 with a structural member of the vehicle 20, such as the sidewall 46. The step assembly 72 may also include mounting hardware, such as bolts and/or screws for attaching the various foot-step assembly 72 components to each other and/or to other vehicle components.

The step assembly 72 may include a first bracket 74 and a second bracket 76. The first bracket 74 is in contact with the interior surface 50 of the longitudinal side 46. For example, the first bracket 74 may be a U-shaped bracket including a pair of flanges 78 attached to the interior surface 50, and a planar surface 80 extending between the flanges 78. The first bracket 74 reinforces the longitudinal side 46 to provide a mounting area for the second bracket 76. The second bracket 76 is in contact with the exterior surface 48 at a location adjacent to the first bracket 74. The longitudinal side 46 may include holes that allow the second bracket 76 to be bolted to the first bracket 74. The second bracket 76 extends transversely outward from the exterior surface 48 away from the vehicle 20. The foot-step 68 is attached to the second bracket 76 on a side of the second bracket 76 opposite the exterior surface 48. The second bracket 76 may be an L-shaped bracket including a first leg 82, a second leg 84, and side panels 86. The first leg 82 is in contact with the exterior surface 48 and the second leg 84 extends outwardly from the first leg 82 at a substantially 90° angle. The legs 82, 84 and the side panels 86 cooperate to define a cavity for receiving the step 68.

The step 68 may include a pair of vertical sidewalls 88, a top wall 90, a bottom wall 92, and a back wall 94 cooperating to define a foot receiving cavity 96. The bottom wall 92 includes a foot supporting surface 98 that may include grips or other non-slip feature. The back wall 94 may include holes for receiving mounting hardware to attach the step to one or both of the brackets 74, 76 and/or the longitudinal side 46. The step 68 may include a decorative outer cover 102 attached around a periphery of the foot receiving cavity 96. A portion of the cover 102 may be integrally formed with each of the walls 88, 90, 92 and include a flange 104 that extends outwardly from a corresponding wall. The flange 104 may be larger than the opening 70 to seat against an outer surface of the fender when the step 68 is installed. The cover 102 may include indicia, such as the word "STEP", to inform a user of its function. Each step 68 may be made of plastic, metal, composite material, or a combination thereof.

The present disclosure is not limited to dually pickup trucks and can be used on other vehicles, which have single wheel assemblies. Some vehicles include a fender having a laterally extending portion large enough to fit a foot-step. For example, a conventional pickup truck may have an extended rear track that requires enlarged fenders. Some sport utility vehicles also include an extended rear track that requires enlarged fenders. These sport utility vehicles may include a roof rack or similar component that is difficult to reach by a person standing on the ground. A foot-step can be disposed in the enlarged fender providing easier access to the roof rack.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A dually pickup truck comprising:
   a rear axle including a dual-wheel assembly on an end of the axle;
   a box including a longitudinal side; a fender positioned over a portion of the dual-wheel assembly and attached to the longitudinal side, wherein the fender includes a leading surface longitudinally forward of the dual-wheel assembly, wherein the leading surface defines an opening; and
   a foot-step disposed within the opening and connected to the longitudinal side.

2. The truck of claim 1 further comprising:
   a frame disposed over and connected to the rear axle; wherein the box is supported by the frame and the longitudinal side includes an interior surface and an exterior surface, wherein the fender is attached to the exterior surface.

3. The truck of claim 2 further comprising a support member connected between the exterior surface of the longitudinal side and an a back side of the foot-step.

4. The truck of claim 2 wherein the foot-step includes a first bracket attached to the interior surface of the longitudinal side, and a second bracket connectedly aligned with the first bracket and extending transversely outward from the exterior surface of the longitudinal side, wherein and the second bracket is disposed between the fender and the exterior surface and is connected to the foot-step.

5. The truck of claim 4 wherein the foot-step is configured to support at least a 300 pound static vertical load.

6. The truck of claim 4 wherein the foot-step further includes a decorative outer cover in contact with the fender to provide an appearance of being part of the fender.

7. A fender assembly for a pickup truck box, comprising:
   a fender attachable to the box and configured to extend outwardly therefrom to define, in combination with the box, a wheel well sized to receive a dual-wheel assembly therein, wherein the fender defines an opening; and
   a foot-step receivable within the opening and attachable to the box by a bracket.

8. The fender assembly of claim 7 wherein the fender further includes a laterally extending portion having a front panel facing towards a cab of the truck and wherein the opening is located within the laterally extending portion.

9. The fender assembly of claim 7 wherein the bracket is disposed between the box and the fender when installed.

10. The fender assembly of claim 7 wherein the bracket has a first side mountable to the box and a second side mountable to the foot-step, wherein the bracket is disposed between the box and the fender when installed.

11. The fender assembly of claim 10 wherein the second side of the bracket defines a cavity for receiving at least a portion of the foot-step therein.

12. The fender assembly of claim 7 wherein the bracket further includes a first bracket connectable to an inside surface of a longitudinal sidewall of the truck box, and a second bracket connectable to an outside surface of the longitudinal sidewall, wherein the second bracket is disposed between the outside surface and the fender.

13. A vehicle comprising:
- a frame;
- a cargo box supported by the frame and including a sidewall partially defining a wheel well and having an interior panel and an exterior panel;
- a wheel assembly at least partially disposed in the wheel well and extending transversely outward past the exterior panel of the sidewall;
- a fender attached to the exterior panel and at least partially covering a portion of the wheel assembly that extends past the exterior panel, wherein the fender defines an opening;
- a bracket assembly connected to the exterior panel and extending outwardly therefrom, wherein the bracket assembly is inboard of the fender; and
- a foot-step for accessing the cargo box disposed within the opening of the fender and attached to the bracket assembly.

14. The vehicle of claim 13 wherein the bracket assembly defines a cavity for receiving at least a back side of the foot-step.

15. The vehicle of claim 13 wherein the bracket assembly further includes a first bracket in contact with the interior panel of the sidewall, and a second bracket in contact with the exterior panel at a location adjacent to the first bracket and extending transversely outward therefrom towards the fender, wherein the foot-step is attached to the second bracket.

16. The vehicle of claim 13 wherein the foot-step further includes a decorative outer cover in cooperation with the fender to appear as part of the fender.

17. The vehicle of claim 13 wherein the fender further includes a laterally extending portion and wherein the step is disposed within the laterally extending portion at a lower end of the laterally extending portion.

18. The vehicle of claim 13 wherein the wheel assembly is a dual-wheel assembly.

19. The vehicle of claim 3 wherein the support member defines a cavity for receiving at least a back side of the foot-step.

20. The vehicle of claim 3 wherein the support member is disposed inboard of the fender.

\* \* \* \* \*